Patented Dec. 23, 1952

2,623,042

UNITED STATES PATENT OFFICE 2,623,042

PREPARATION OF ACID-SOLUBLE CELLULOSE DERIVATIVE

Charles L. P. Vaughan, Wilmington, Del., assignor to Hercules Powder Company, Wilmington, Del., a corporation of Delaware No Drawing. Application December 23, 1949, Serial No. 134,854

11 Claims. (Cl. 260—231)

This invention relates to the preparation of dialkylaminoalkyl ethers of cellulosic compounds and, more particularly, to a process of reacting dialkylaminoalkyl halides with cellulose or partially substituted celluloses in an inert solvent whereby a highly substituted and acid-soluble dialkylaminoalkyl cellulose derivative is obtained.

Many attempts have been made in the past to produce nitrogen-containing cellulose derivatives which would be acid soluble. One of the earliest suggestions for preparing such products was the reaction of alkali cellulose with a halogen alkylamine. However, the products obtained by this process were of only a very low degree of substitution and were not acid soluble. Attempts have also been made to react a halogen-containing cellulose derivative with ammonia or an amine, but in neither case were the products acid soluble. More recently, it has been suggested that amino derivatives could be prepared by reacting an alkali metal cellulosate, prepared by treating cellulose with an alkali metal in liquid ammonia, with a monohalogen amine, but again only a low degree of substitution was obtained and the reaction was a difficult and inefficient one.

Now in accordance with this invention it has been found that acid-soluble highly substituted dialkylaminoalkyl ethers of cellulosic compounds containing an etherifiable hydroxyl group, that is, cellulose or a partially substituted cellulose, may be prepared by reacting a suspension of an alkali salt of the cellulosic compound in an inert organic solvent with a dialkylaminoalkyl halide.

The following examples will illustrate the preparation of the dialkylaminoalkyl ethers of cellulosic compounds in accordance with this invention. All parts and percentages are by weight unless otherwise indicated.

Example 1

Four parts of cotton linters (20 mesh) were suspended in 200 parts of dioxane and 29.6 parts of a 20% aqueous sodium hydroxide solution (6 moles per anhydroglucose unit) were added. The slurry was agitated and heated for one hour at 90° C., after which 17 parts of diethylaminoethyl chloride hydrochloride (4 moles anhydroglucose unit) were added and heating was continued at 90° C. for an additional four hours. The fibrous product was separated and then washed with an aqueous solution of ethanol and acetone, then with anhydrous acetone and finally was dried in vacuo at 60° C. The white fibrous product amounted to 7 parts and had a degree of substitution of 0.77 diethylaminoethyl group per anhydroglucose unit. This diethylaminoethyl cellulose was soluble in water, 5% sodium hydroxide, 10% hydrochloric acid, and 20% acetic acid, giving viscous solutions in each case.

Example 2

Two parts of cotton linters (20 mesh) were suspended in 100 parts of dioxane and 31 parts of a 40% aqueous solution of trimethyl benzyl ammonium hydroxide (6 moles per anhydroglucose unit) were added. The slurry was agitated at 35°–40° C. for ½ hour and then 8.5 parts of diethylaminoethyl chloride hydrochloride (4 moles per anhydroglucose unit) were added and the reaction mixture was agitated for an additional 4 hours at 35°–40° C. The fibrous product was separated and washed with a 7:3 mixture of acetone and isopropyl alcohol, then with acetone and finally was dried in vacuo at 60° C. The diethylaminoethyl cellulose so obtained amounted to 3.1 parts and contained 5.35% nitrogen, which corresponds to a degree of substitution of 1.0 diethylaminoethyl group per anhydroglucose unit. The white fibrous material was soluble in water, 5% sodium hydroxide, 10% hydrochloric acid, and 20% acetic acid, giving clear, viscous solutions in each case. It dissolved in methanol to form a thixotropic solution.

Example 3

Six parts of 20 mesh wood pulp (96% alpha cellulose) were suspended in 80 parts of tert-butanol and 58 parts of a 40% aqueous solution of trimethyl benzyl ammonium hydroxide (3.75 moles per anhydroglucose unit) were added. After agitating the slurry for ½ hour at 42° C., 15.9 parts of diethylaminoethyl chloride hydrochloride (2.5 moles per anhydroglucose unit) were added and the reaction mixture was agitated for an additional 4 hours at 42° C. The white fibrous product was separated as described in Example 2. The diethylaminoethyl cellulose so obtained amounted to 9 parts and had a degree of substitution of 0.81. It had the same solubilities as that obtained in Example 2.

Example 4

Six parts of chemical cotton (40 mesh) were suspended in 100 parts of dioxane and 93 parts of a 40% aqueous solution of trimethyl benzyl ammonium hydroxide (6 moles per anhydroglucose unit) were added. The slurry was agitated for ½ hour at 40° C. and then 21.3 parts of dimethylaminoethyl chloride hydrochloride (4 moles per anhydroglucose unit) were added and the reaction mixture was agitated for an additional 4 hours at 40° C. The fibrous product was separated as described in Example 2 above. The dimethylaminoethyl cellulose so obtained amounted to 9 parts, had a degree of substitution of 1.23 and was soluble in water, 5% sodium hydroxide, and 20% acetic acid.

*Example 5*

Six parts of shredded cellulose were suspended in 90 parts of benzene and 70 parts of a 40% aqueous solution of trimethyl benzyl ammonium hydroxide (4.5 moles per anhydroglucose unit) were added. The slurry was agitated for ½ hour at 40° C. and 19.1 parts of diethylaminoethyl chloride hydrochloride (3 moles per anhydroglucose unit) were then added. After agitating the reaction mixture for 4 hours at 40° C., the fibrous product was separated and purified as described in Example 2. The white fibrous diethylaminoethyl cellulose so obtained amounted to 8.2, had a degree of substitution of 0.63 and was soluble in water, 5% sodium hydroxide, and 20% acetic acid.

*Example 6*

Six parts of chemical cotton (40 mesh) were suspended in 100 parts of dioxane and 93 parts of a 40% aqueous solution of trimethyl benzyl ammonium hydroxide (6 moles per anhydroglucose unit) were added. The slurry was agitated for ½ hour at 35°–40° C., after which 33.8 parts of di-n-butylaminoethyl chloride hydrochloride (4 moles per anhydroglucose unit) were added. The reaction mixture was agitated for 4 hours at 35°–40° C. and the fibrous product was separated and purified as described in Example 2. The di-n-butylaminoethyl cellulose so obtained amounted to 8.2 parts and had a degree of substitution of 0.44. It was insoluble in water and dilute alkali but was soluble in 20% acetic acid.

*Example 7*

Two parts of a hydroxyethyl cellulose having a degree of substitution of 0.15 (base weight of 169) were suspended in 100 parts of dioxane and 13.3 parts of a 20% aqueous solution of sodium hydroxide (5.62 moles per base weight) were added. The slurry was agitated and heated at 90° C. for one hour and then 7.65 parts of diethylaminoethyl chloride hydrochloride (3.76 moles per base weight) were added. The reaction mixture was then agitated for an additional 4 hours at 90° C. The fibrous product was separated and washed with an aqueous solution of ethanol and acetone, then with anhydrous acetone and finally was dried in vacuo at 60° C. The product so obtained amounted to 2.8 parts and had a degree of substitution of 0.77 diethylaminoethyl group per anhydroglucose unit. The white fibrous product was soluble in water, 5% sodium hydroxide, and 20% acetic acid, giving a clear, viscous solution in each case.

*Example 8*

Two parts of a sulfoethyl cellulose having a degree of substitution of 0.32 and a base weight of 204 were suspended in 100 parts of dioxane and 12 parts of a 20% aqueous solution of sodium hydroxide (6 moles per base weight) were added. The slurry was heated at 90° C. for one hour and then 6.75 parts of diethylaminoethyl chloride hydrochloride (4 moles per base weight) were added. The reaction was agitated and refluxed for 4 hours. The gummy product which was obtained was separated from the solvent, dissolved in 20% acetic acid, and then reprecipitated by pouring the acetic acid solution into a 7.3 mixture of acetone and isopropyl alcohol. It was then washed with an aqueous solution of ethanol and acetone, then with anhydrous acetone, and then hexane, and finally was dried in vacuo at 60° C. The diethylaminoethyl sulfoethyl cellulose so obtained had a degree of substitution of 0.39 diethylaminoethyl groups and was soluble in water, dilute acids, dilute alkalies, and methanol, giving clear, viscous solutions in each case.

In accordance with this invention, dialkylaminoalkyl ethers of cellulose or partially substituted celluloses may be prepared by reacting a dialkylaminoalkyl halide with the cellulosic compound in an inert organic solvent medium and in the presence of an alkaline reagent. The reaction may be represented as follows:

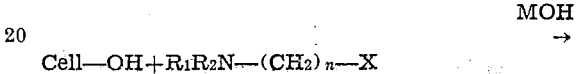

$$\text{Cell—OH} + R_1R_2N\text{—}(CH_2)_n\text{—}X \xrightarrow{MOH} \text{Cell—O—}(CH_2)_n\text{—}NR_1R_2 + MX + H_2O$$

where Cell—OH represents an etherifiable hydroxyl group of cellulose or a partially substituted cellulose, $R_1$ and $R_2$ are alkyl radicals, X is a halogen, $n$ is an integer of from 2 to 4, and MOH is a strongly alkaline hydroxide.

Any cellulosic compound containing an etherifiable hydroxyl radical, that is, free or unreacted hydroxyl groups, may be reacted with dialkylaminoalkyl halides in accordance with this invention. Examples of such cellulosic compounds are cellulose and partially substituted celluloses such as the alkyl celluloses as, for example, methyl cellulose, ethyl cellulose, propyl cellulose, butyl cellulose, etc., hydroxyalkyl celluloses as, for example, hydroxyethyl cellulose, etc., sulfoalkyl celluloses as, for example, sulfoethyl cellulose, carboxyalkyl celluloses as, for example, carboxymethyl and carboxyethyl cellulose, mixed cellulosic derivatives such as carboxymethyl hydroxyethyl cellulose, etc.

The dialkylaminoalkyl halides which may be reacted with the cellulosic compound may be defined as those having the general formula

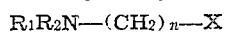

$$R_1R_2N\text{—}(CH_2)_n\text{—}X$$

where $R_1$ and $R_2$ may be any alkyl radical such as methyl, ethyl, propyl, isopropyl, butyl, isobutyl, etc., $R_1$ and $R_2$ may be alike or different and $n$ may be any integer of from 2 to 4, that is, the dialkylaminoalkyl halide may be a dialkylaminoethyl, aminopropyl, or aminobutyl halide. The solubility of the product decreases as $n$ increases and, consequently, to produce acid-soluble dialkylaminoalkyl ethers of cellulose or partially substituted celluloses, $n$ should not exceed 4. In the same way, as the length of $R_1$ and $R_2$ increases, the solubility of the product decreases and accordingly they will preferably contain not more than 4 carbon atoms or a maximum of 8 carbon atoms for the two radicals. X may be any halide; i. e., chlorine, bromine, or iodine. The dialkylaminoalkylation reagent may be used in the form of the free base or a salt thereof as, for example, the hydrohalide salts such as diethylaminoethyl chloride hydrochloride, diethylaminoethyl bromide hydrobromide, the sulfate salts, etc. As used in this specification and the claims appended hereto, the term dialkylaminoalkyl halide is meant to include both the free base and the salts thereof.

The reaction between the cellulosic compound and the dialkylaminoalkyl halides is carried out in the presence of an alkaline reagent. Any strongly alkaline hydroxide as, for example, the alkali metal hydroxides such as sodium or potassium hydroxide, or the quaternary ammonium hydroxides such as trimethylbenzyl ammonium hydroxide, dimethyl dibenzyl ammonium hydroxide, etc., may be used. The alkaline reagent is believed to serve two purposes in the dialkylaminoalkylation reaction, to swell and disperse the cellulosic compound, thus activating it, and to catalyze the reaction.

Any mode of introducing the alkaline reagent in the reaction mixture may be utilized. The cellulosic compound may be converted to an alkali cellulose by suspending it in an organic solvent and treating the slurry with an aqueous solution of from about 20% to about 50% concentration of the alkaline reagent. In this alkali cellulose preparation, the amount of alkaline reagent added is adjusted to approximately 4 to 6 molecular equivalents per anhydroglucose unit or base weight as the case may be, when the dialkylaminoalkyl halide is used in the form of its salt. However, when the dialkylaminoalkyl halide is used in the form of the free base, then lesser amounts of the alkaline reagent may be used, in general from about 1.6 to 4 molecular equivalents of the alkaline reagent per anhydroglucose unit or base weight, may be used. The mixture of cellulosic compound, organic solvent, and alkaline reagent is then agitated at room temperature or at elevated temperatures as, for example, from about 70° to about 125° C. for about ½ to one hour. An alternative method of alkali cellulose formation consists of pretreating the cellulosic compound with an aqueous alkaline reagent and then suspending the crumbs so formed in an organic solvent before the dialkylaminoalkylation reaction. Substantially the same results are obtained with either procedure of alkali cellulose formation.

By alkali cellulose or cellulosic compound as used in this specification and appended claims is meant the alkali metal salts and ammonium salts as, for example, the quaternary ammonium salts, of the cellulosic compound.

The reaction between the alkali cellulose or other cellulosic compound, and the dialkylaminoalkyl halide in accordance with this invention is carried out in the presence of an organic solvent. Any organic solvent may be used as the medium for the dialkylaminoalkylation reaction, provided that it is inert under the reaction conditions; that is, that it does not react with the dialkylaminoalkyl halide or the alkali cellulose. The main functions of the organic solvent are to serve as a heat transfer medium, and as a dispersing or insolubilizing agent so that the dialkylaminoalkyl ether will remain in a finely fibrous condition. Suitable organic solvents which may be used for the reaction are dioxane, isopropanol, tertiary butanol, tetrahydrofuran, and ethylene glycol diethyl ether. Best results are obtained with organic solvents that are water soluble such as dioxane, tertiary butanol, etc. In these media, water cannot accumulate in the cellulose derivative phase of the reaction mixture. However, the dialkylaminoalkylation reaction may be satisfactorily carried out in such water-insoluble organic solvents as benzene, toluene, etc. The cellulosic compound may be suspended in the solvent before the treatment with the alkaline reagent, or the alkali cellulose may be prepared and then suspended in the solvent. The amount of solvent used is determined by the type of agitation available for the heterogeneous reaction since mixing becomes increasingly difficult with increasing celluose proportions, and also depends upon the form of cellulose used; i. e., the state of subdivision. In general, the reaction proceeds most favorably with a cellulose to solvent ratio of about 1:9 to about 1:25. This is particularly true with a cellulosic compound such as ground cotton linters, but with unground linters, a ratio of about 1:25 to about 1:50 may be desirable.

The reaction in accordance with this invention is carried out at a temperature of from about 25 to about 125° C. and preferably at a temperature of about 40 to about 90° C. In general, a higher temperature is used when the alkaline reagent is an alkali hydroxide as, for example, a temperature of from about 70° to 125° C. and preferably from about 80°–110° C. and lower temperatures as, for example, from about 35°–45° C., may be used when the alkaline reagent is a quaternary ammonium hydroxide. If the particular solvent being used as the diluent in the reaction has a boiling point below this temperature range, the reaction may be carried out under pressure, as in an autoclave. The temperature of the suspension of alkali cellulosic compound in organic solvent may be adjusted to the reaction temperature prior to the addition of the dialkylaminoalkyl halide. The amount of the dialkylaminoalkylation reagent added will depend upon the degree of substitution desired, reactivity of the reagent, etc. In general, at least about two molecular equivalents of the dialkylaminoalkyl halide per anhydroglucose unit are added to produce an acid-soluble product. Following the addition of the etherification reagent, the reaction is allowed to proceed at the specified temperature for from about 1 to about 6 hours and preferably from about 2½ to about 4 hours. Longer reaction times may be used but it is believed that no advantages are realized from reaction times of greater than about 6 hours.

The dialkylaminoalkyl ether of the cellulosic compound, when prepared according to this invention, is readily isolated from the reaction mixture by filtration or any other convenient means of separating the liquid from the fibrous product. It may then be purified by washing the fibrous product to remove the alkaline reagent and any unreacted dialkylaminoalkyl halide. Any convenient solvent for this washing operation may be used, which solvent will not dissolve the dialkylaminoalkyl ether but which will dissolve the dialkylaminoalkyl halide and the alkaline reagent. Alcohols such as methanol and ethanol are not usually used as a washing solvent since the products possess varying degrees of solubilities in these alcohols. An aqueous methanol-acetone, ethanol-acetone or isopropanol-acetone solution followed by a wash with anhydrous acetone has been found to be a convenient solvent for this washing operation. The fibrous product may then be dried by any desirable means.

The process of preparing dialkylaminoalkyl ethers of cellulosic compounds by reacting a suspension of the alkali cellulosic compound in an inert organic solvent with a dialkylaminoalkyl halide in accordance with this invention makes it possible to produce these products with a high degree of substitution by an efficient method. The product is obtained as a fibrous product and thus the precipitation step necessary to isolate the product in a solution process is eliminated.

The dialkylaminoalkyl ethers of cellulose or partially substituted celluloses are soluble in water, aqueous alkali, and aqueous acid depending upon their degree of substitution and the length of the alkyl chains in the dialkylaminoalkyl group. For example, with longer chain alkyl groups a degree of substitution of about 0.4 will impart acid solubility to cellulose, whereas with a shorter chain alkyl a substitution of from 0.6 to 0.7 may be required. As the degree of substitution increases, so also does the solubility in water and aqueous alkali. In addition, at higher substitutions the dialkylaminoalkyl celluloses are usually soluble in such alcohols as methanol and ethanol to yield a readily gelled or thixotropic solution. In the case of partially substituted celluloses a somewhat lower degree of substitution of dialkylaminoalkyl groups may be required to impart acid solubility. A partially substituted cellulose which has good solution properties in water and alkali will require only a low dialkylaminoalkyl substitution in order for the product to be soluble in acid. However, if the partially substituted cellulose has poor water and alkali solubility then, as in the case of cellulose itself, a higher degree of substitution is necessary to impart acid solubility to the product. By carrying out the dialkylaminoalkylation reaction in accordance with this invention it is possible to obtain any desired degree of substitution.

The dialkylaminoalkyl ethers of cellulose or partially substituted celluloses have many practical applications because of their solubility in aqueous systems which are acid, neutral, or basic. They are of value as thickening and emulsifying agents in many situations where the acid-insoluble carboxymethyl and sulfoethyl celluloses have failed. In particular, they may be used as sizes for natural and synthetic fibers, additives for synthetic detergents, media for pigment dispersions, dye paste thickeners, binders for ceramics, and in special purpose adhesives.

What I claim and desire to protect by Letters Patent is:

1. The process of preparing an acid-soluble dialkylaminoalkyl ether of a cellulosic compound containing etherifiable hydroxyl radicals, said ether having a degree of substitution of at least about 0.4 dialkylaminoalkyl group per glucose unit, which comprises reacting a suspension of an alkali cellulosic compound in an inert organic solvent with at least about 2 moles per glucose unit of a dialkylaminoalkyl halide having the formula $$R_1R_2N-(CH_2)_n-X$$

where $R_1$ and $R_2$ are alkyl radicals, $n$ is an integer of from 2 to 4, and X is halogen, in the presence of an alkaline reagent at a temperature of from about 25° C. to about 125° C.

2. The process of preparing an acid-soluble dialkylaminoalkyl ether of a cellulosic compound containing etherifiable hydroxyl radicals, said ether having a degree of substitution of at least about 0.4 dialkylaminoalkyl group per glucose unit, which comprises reacting a suspension of the said cellulosic compound in an inert organic solvent with at least about 2 moles per glucose unit of a dialkylaminoalkyl halide having the formula $$R_1R_2N-(CH_2)_n-X$$

where $R_1$ and $R_2$ are alkyl radicals, $n$ is an integer of from 2 to 4, and X is halogen, in the presence of an alkaline reagent at a temperature of from about 25° C. to about 125° C.

3. The process of preparing an acid-soluble dialkylaminoalkyl ether of a cellulosic compound containing etherifiable hydroxyl radicals, said ether having a degree of substitution of at least about 0.4 dialkylaminoalkyl group per glucose unit, which comprises reacting the cellulosic compound with an aqueous solution of a strongly basic hydroxide and then reacting a suspension of the alkali cellulosic compound in an inert organic solvent with at least about 2 moles per glucose unit of a dialkylaminoalkyl halide having the formula $$R_1R_2N-(CH_2)_n-X$$

where $R_1$ and $R_2$ are alkyl radicals, $n$ is an integer of from 2 to 4, and X is halogen, at a temperature of from about 25° C. to about 125° C.

4. The process of preparing an acid-soluble dialkylaminoalkyl ether of cellulose containing at least about 0.4 dialkylaminoalkyl group per glucose unit, which comprises reacting a suspension of alkali cellulose in an inert organic solvent with at least about 2 moles per glucose unit of a dialkylaminoalkyl halide having the formula $$R_1R_2N-(CH_2)_n-X$$

where $R_1$ and $R_2$ are alkyl radicals, n is an integer of from 2 to 4, and X is halogen, at a temperature of from about 25° C. to about 125° C.

5. The process of preparing an acid-soluble dialkylaminoalkyl ether of a partially substituted hydroxyalkyl cellulose containing at least about 0.4 dialkylaminoalkyl group per glucose unit, which comprises reacting a suspension of an alkali hydroxyalkyl cellulose in an inert organic solvent with at least about 2 moles per glucose unit of a dialkylaminoalkyl halide having the formula $$R_1R_2N-(CH_2)_n-X$$

where $R_1$ and $R_2$ are alkyl radicals, n is an integer of from 2 to 4, and X is halogen, at a temperature of from about 25° C. to about 125° C.

6. The process of preparing an acid-soluble dialkylaminoalkyl ether of a partially substituted sulfoalkyl cellulose containing at least about 0.4 dialkylaminoalkyl group per glucose unit, which comprises reacting a suspension of an alkali sulfoalkyl cellulose in an inert organic solvent with at least about 2 moles per glucose unit of a dialkylaminoalkyl halide having the formula $$R_1R_2N-(CH_2)_n-X$$

where $R_1$ and $R_2$ are alkyl radicals, n is an integer of from 2 to 4, and X is halogen, at a temperature of from about 25° C. to about 125° C.

7. The process of preparing an acid-soluble diethylaminoethyl ether of cellulose containing at least about 0.6 diethylaminoethyl group per glucose unit, which comprises reacting a suspension of alkali cellulose in an inert organic solvent with at least about 2 moles per glucose unit of a diethylaminoethyl halide at a temperature of from about 25° C. to about 125° C.

8. The process of preparing an acid-soluble diethylaminoethyl ether of a partially substituted hydroxyethyl cellulose containing at least about 0.4 diethylaminoethyl group per glucose unit, which comprises reacting a suspension of alkali hydroxyethyl cellulose in an inert organic solvent with at least about 2 moles per glucose unit of a diethylaminoethyl halide at a temperature of from about 25° C. to about 125° C.

9. The process of preparing an acid-soluble diethylaminoethyl ether of a partially substituted sulfoethyl cellulose containing at least about 0.4 diethylaminoethyl group per glucose unit, which comprises reacting a suspension of alkali sulfoethyl cellulose in an inert organic solvent with at least about 2 moles per glucose unit of a diethylaminoethyl halide at a temperature of from about 25° C. to about 125° C.

10. The process of preparing an acid-soluble dimethylaminoethyl ether of cellulose containing at least about 0.6 dimethylaminoethyl group per glucose unit, which comprises reacting a suspension of alkali cellulose in an inert organic solvent with at least about 2 moles per glucose unit of a dimethylaminoethyl halide at a temperature of from about 25° C. to about 125° C.

11. The process of preparing an acid-soluble di-n-butylaminoethyl ether of cellulose containing at least about 0.4 di-n-butylaminoethyl group per glucose unit, which comprises reacting a suspension of alkali cellulose in an inert organic solvent with at least about 2 moles per glucose unit of a di-n-butylaminoethyl halide at a temperature of from about 25° C. to about 125° C.

CHARLES L. P. VAUGHAN.

REFERENCES CITED

The following references are of record in the file of this patent:

UNITED STATES PATENTS

| Number | Name | Date |
|---|---|---|
| 1,777,970 | Hartmann | Oct. 7, 1930 |
| 2,084,125 | Bock et al. | June 15, 1937 |
| 2,087,549 | Powers et al. | July 20, 1937 |
| 2,136,296 | Hardy | Nov. 8, 1938 |
| 2,163,723 | Whitehead | June 27, 1939 |
| 2,181,264 | Dreyfus | Nov. 28, 1939 |
| 2,362,900 | Groombridge | Nov. 14, 1944 |
| 2,398,767 | Burke | Apr. 23, 1946 |
| 2,517,577 | Klug et al. | Aug. 8, 1950 |
| 2,539,417 | Grassie | Jan. 30, 1951 |

FOREIGN PATENTS

| Number | Country | Date |
|---|---|---|
| 590,001 | Great Britain | July 4, 1947 |